United States Patent
Simoni (10) Patent No.: US 7,185,997 B2
(45) Date of Patent: *Mar. 6, 2007

(54) HANDS-FREE FLASHLIGHT SUSPENDED FROM NECK OF USER

(76) Inventor: Jacquelyn R. Simoni, 1 S. 669 Birchbrook Ct., Glen Ellyn, IL (US) 60137

( * ) Notice: Subject to any disclaimer, the term of this patent is extended or adjusted under 35 U.S.C. 154(b) by 0 days.

This patent is subject to a terminal disclaimer.

(21) Appl. No.: 11/301,617

(22) Filed: Dec. 13, 2005

(65) Prior Publication Data

US 2006/0087833 A1   Apr. 27, 2006

Related U.S. Application Data

(63) Continuation-in-part of application No. 10/749,708, filed on Dec. 31, 2003, now Pat. No. 7,008,075.

(60) Provisional application No. 60/638,756, filed on Dec. 23, 2004.

(51) Int. Cl.
*F21V 33/00* (2006.01)

(52) U.S. Cl. .............. 362/108; 362/103; 362/191; 119/859

(58) Field of Classification Search ........... 362/103, 362/108, 190, 191, 234, 251; 119/858, 859
See application file for complete search history.

(56) References Cited

U.S. PATENT DOCUMENTS

| | | | |
|---|---|---|---|
| 2,234,995 A | 3/1941 | Waechter | 240/59 |
| 4,173,201 A | 11/1979 | Chao et al. | 119/106 |
| 4,400,763 A | 8/1983 | Kribs et al. | 362/103 |
| 4,425,600 A | 1/1984 | Barnhart | 362/84 |
| 4,458,299 A | 7/1984 | Stephens et al. | 362/158 |
| 4,625,339 A | 12/1986 | Peters | 2/160 |
| 4,734,834 A | 3/1988 | Petzl et al. | 362/187 |
| 4,812,953 A | 3/1989 | Ask et al. | 362/103 |
| 4,875,145 A | 10/1989 | Roberts | 362/103 |
| 4,895,110 A | 1/1990 | LoCascio | 119/106 |
| 4,974,130 A | 11/1990 | Friedman | 362/199 |
| 5,046,456 A | 9/1991 | Heyman et al. | 119/106 |
| 5,056,696 A | 10/1991 | Lahr | 224/148 |
| 5,140,946 A | 8/1992 | Pennock et al. | 119/106 |
| 5,193,896 A | 3/1993 | Oberlander | 362/103 |
| 5,255,168 A | 10/1993 | Stevens | 362/108 |
| 5,359,501 A | 10/1994 | Stevens | 362/108 |
| 5,370,082 A | 12/1994 | Wade | 119/859 |
| 5,412,896 A | 5/1995 | Morgan | 43/4 |
| 5,535,106 A | 7/1996 | Tangen | 362/108 |
| D379,252 S | 5/1997 | McIntosh | D30/152 |

(Continued)

*Primary Examiner*—Laura K. Tso
(74) *Attorney, Agent, or Firm*—Jenkens & Gilchrist (57) ABSTRACT

A method and apparatus for illuminating the area in front of a person without requiring the use of the person's hands, by suspending from the neck of the person a housing containing at least one LED light source emitting a light beam extending forwardly from the person, a battery power supply for the light source, and a switch connected between the light source and the power supply for energizing and de-energizing the light source. The housing is shaped to rest against the chest of the person so that the direction of the light beam remains substantially stable. The housing may be pivotable relative to a connector to permit the light beam from the light source to be directed forwardly from the person through a preselected range of angles both above and below a horizontal axis.

16 Claims, 10 Drawing Sheets

U.S. PATENT DOCUMENTS

| | | | |
|---|---|---|---|
| 5,630,382 A | 5/1997 | Barbera et al. | 119/859 |
| 5,738,432 A | 4/1998 | Okko et al. | 362/103 |
| D394,720 S | 5/1998 | Yuen | D26/39 |
| D405,202 S | 2/1999 | Fattori et al. | D26/39 |
| 5,921,664 A * | 7/1999 | Lee | 362/296 |
| 5,950,571 A | 9/1999 | Schade | 119/859 |
| 5,967,095 A | 10/1999 | Greves | 119/795 |
| D422,734 S | 4/2000 | Stephens | D26/49 |
| D429,014 S | 8/2000 | Stephens | D26/49 |
| 6,095,657 A | 8/2000 | Kent | 362/108 |
| 6,170,968 B1 | 1/2001 | Caswell | 362/469 |
| 6,220,720 B1 | 4/2001 | Stephens | 362/205 |
| 6,224,235 B1 | 5/2001 | Parker | 362/190 |
| 6,289,849 B1 | 9/2001 | Macedo et al. | 119/796 |
| 6,341,874 B1 | 1/2002 | Rubin | 362/103 |
| 6,394,040 B1 | 5/2002 | Axel | 119/859 |
| 6,481,869 B1 | 11/2002 | Horandel et al. | 362/251 |
| D470,615 S | 2/2003 | Janice et al. | D26/39 |
| 6,557,498 B1 | 5/2003 | Smierciak et al. | 119/858 |
| 6,695,269 B1 | 2/2004 | Anscher | 248/225 |
| 6,805,460 B1 | 10/2004 | Zoller et al. | 362/103 |
| 6,892,678 B2 | 5/2005 | Cheng | 119/859 |
| 7,008,075 B2 * | 3/2006 | Simoni | 362/108 |

* cited by examiner

HANDS-FREE FLASHLIGHT SUSPENDED FROM NECK OF USER

CROSS-REFERENCE TO RELATED APPLICATION

This invention claims the priority of U.S. Provisional Patent Application Ser. No. 60/638,756, filed Dec. 23, 2004, for "Personal LED Flashlight."

This application is a continuation-in-part of application Ser. No. 10/749,708 filed Dec. 31, 2003 now U.S. Pat. No. 7,008,075 and entitled "A SAFETY FLASHLIGHT FOR DOGS."

FIELD OF THE INVENTION

The present invention relates generally to a hands-free flashlight and, more particularly, to a lightweight device that is suspended from a person's neck to illuminate a region in front of the person.

SUMMARY OF THE INVENTION

In accordance with the present invention, there is provided a method and apparatus for illuminating the area in front of a person without requiring the use of the person's hands, by suspending from the neck of the person a housing containing at least one LED light source emitting a light beam extending forwardly from the person, a battery power supply for the light source, and a switch connected between the light source and the power supply for energizing and de-energizing the light source. The housing is shaped to rest against the chest of the person so that the direction of the light beam remains substantially stable. The light source may comprise a plurality of LED light sources.

In one embodiment, a connector is hinged to the housing, and a flexible loop is coupled to the connector for suspending the housing from the neck of the person so that the housing is located in front of the chest of the person. The housing is pivotable relative to the connector to permit the light beam from the light source to be directed forwardly from the person through a preselected range of angles both above and below a horizontal axis. The hinge between the connector and the housing may restrict the movement of said housing after it has been positioned to direct the light beam at a desired angle.

BRIEF DESCRIPTION OF THE DRAWINGS

The invention may best be understood by reference to the following description taken in conjunction with the accompanying drawings, in which.

DETAILED DESCRIPTION OF THE ILLUSTRATED EMBODIMENTS

Although the invention will be described next in connection with certain preferred embodiments, it will be understood that the invention is not limited to those particular embodiments. On the contrary, the description of the invention is intended to cover all alternatives, modifications, and equivalent arrangements as may be included within the spirit and scope of the invention as defined by the appended claims.

Figure 1A:
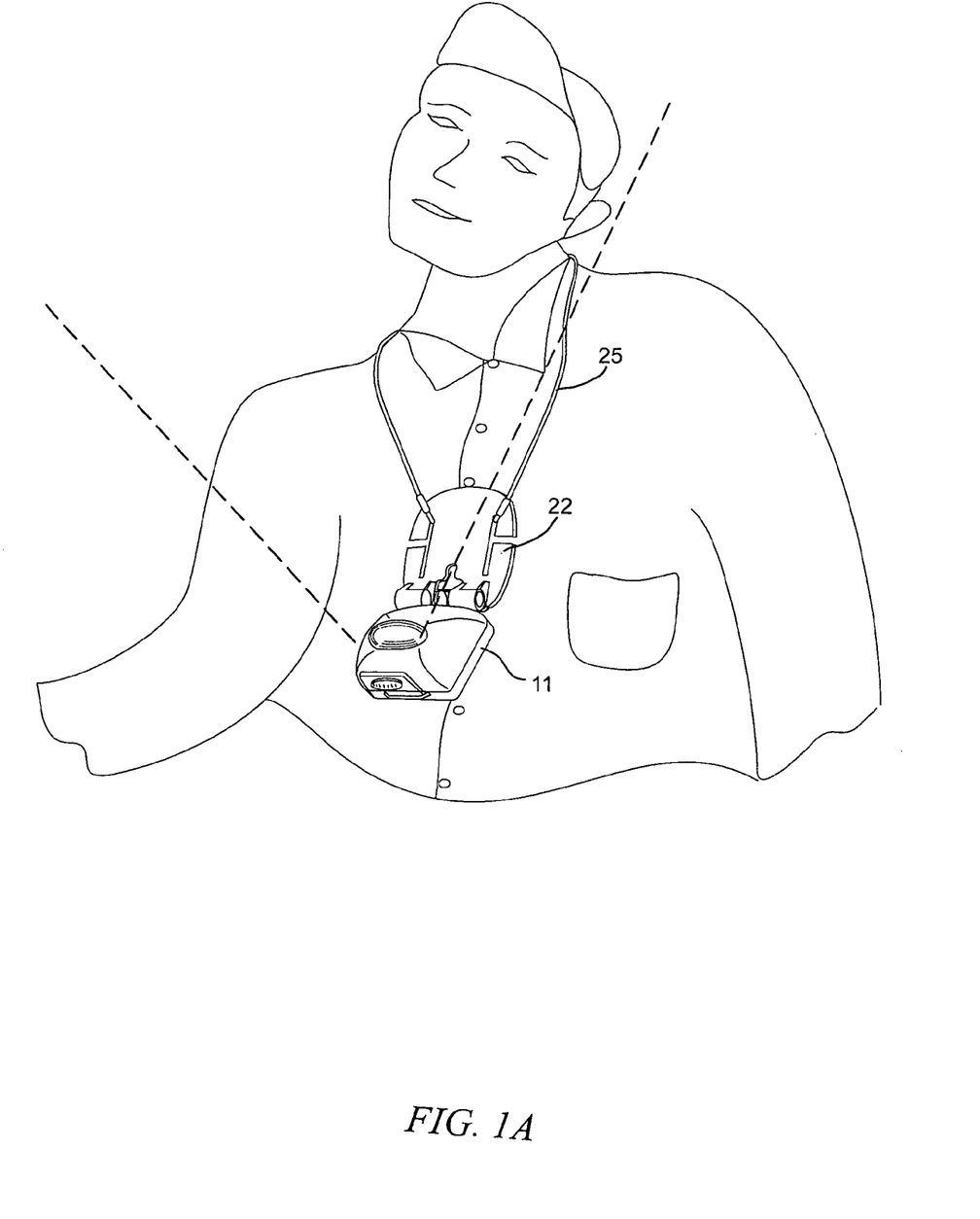
FIG. 1A is a front perspective view of a person wearing a hands-free flashlight, according to one embodiment of the present invention, with the light beam directed slightly downwardly.
Figure 1B:
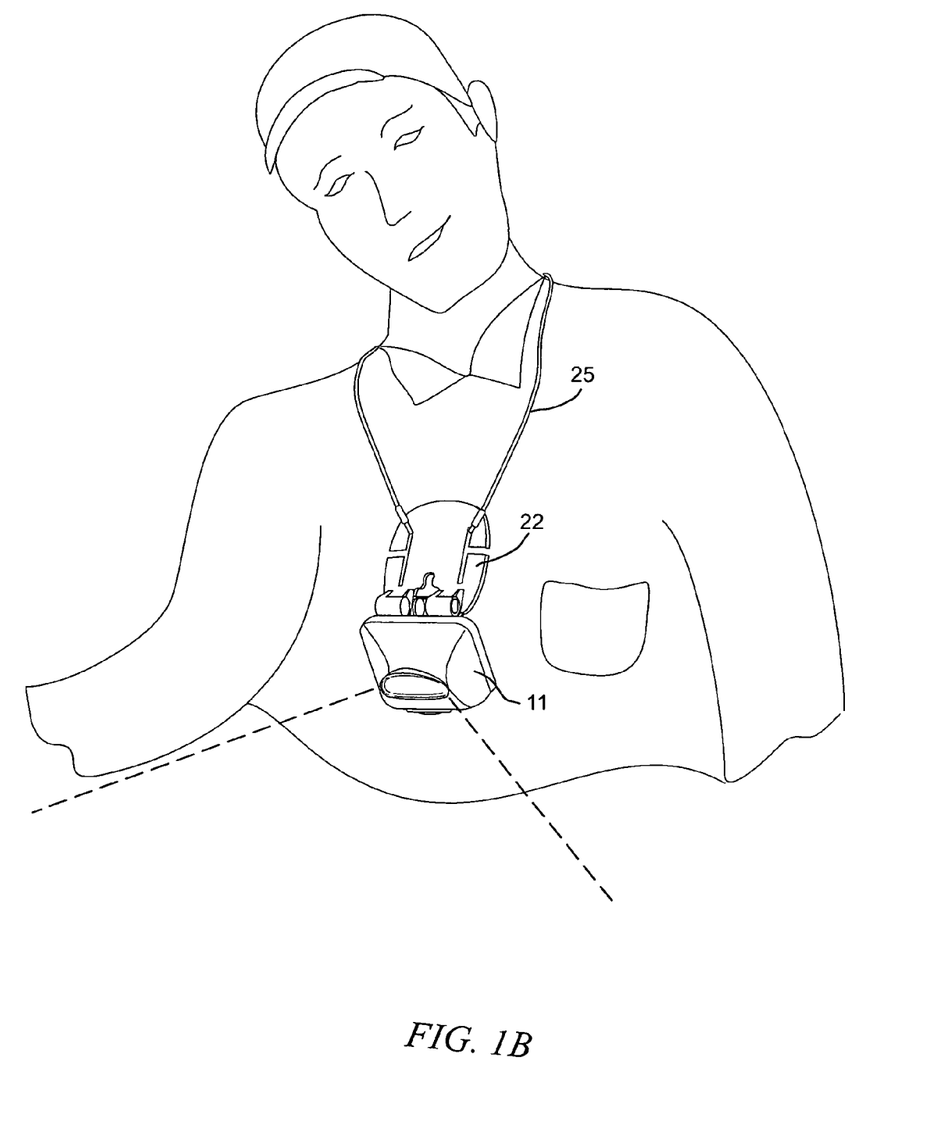
FIG. 1B is the same as FIG. 1A but with the flashlight the light beam directed upwardly.

Turning now to the drawings, and referring initially to FIGS. 1A and 1B, a flashlight 10, according to one embodiment of the present invention, includes a housing 11 made of molded plastic material and adapted to be suspended from the neck of a user (see FIGS. 1A and 1B). By suspending the housing 11 from the neck of the user so that the housing rests against the chest of the user, the light beam produced by the light source in the housing remains relatively stable. For example, the direction of the light beam does not move with movements of the user's head. Because the housing 11 can be pivoted about a horizontal axis (as described in detail below), the elevation angle of the beam may be adjusted to direct the beam downwardly (as depicted in FIG. 1A) or upwardly (as depicted in FIG. 1B) from horizontal. Thus, the light beam may be directed onto different objects located at different elevations, or to illuminate regions at varying distances in front of the user.

Figure 2:
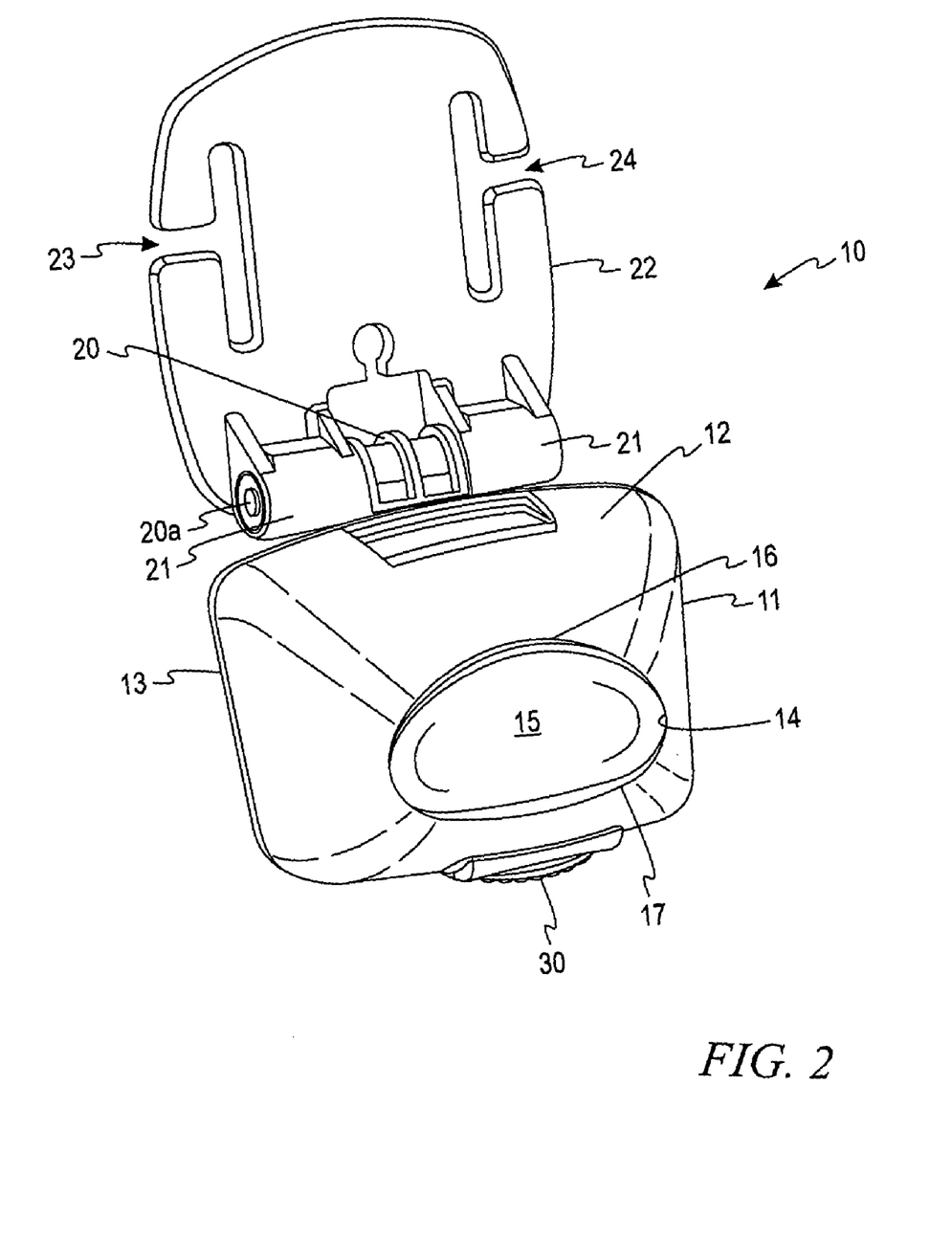
FIG. 2 is an enlarged perspective view of the flashlight shown in FIGS. 1A and 1B.

As can be seen in FIG. 2, the housing 11 includes a front section 12 and a rear section 13 which mate to form an internal cavity to contain the components described below. The front section 12 and the rear section 13 are molded, along their respective joining internal edges, to form a snap fitting of the kind well known in the state of the art. The front and rear sections 12 and 13 may thus be easily taken apart for access to the internal cavity. Alternatively, the two parts may be joined by an integral "living hinge" on one side and an integral snap-type latch on the opposite side to hold the two sections 12 and 13 together.

The front housing section 12 forms a substantially oval aperture 14 for receiving a translucent or transparent lens 15 through which light from sources inside the housing can be transmitted forwardly from the housing. In the illustrative embodiment, the front housing section forms upper and lower rims 16 and 17 along the upper and lower edges of the aperture 14 to prevent light from being transmitted straight up or down from the aperture. The ends of the aperture, however, are unobstructed so that light can be transmitted laterally directly from the end edges of the aperture 14.

The illustrative flashlight 10 forms a unit that may be made small and compact for ease of packaging, handling and use, and to reduce cost. For example, one preferred embodiment uses a housing of approximately 2⅛ inches in the x dimension, 1⅝ inches in the y dimension and approximately ⅞ inches thick or deep. It will be understood, however, that the dimensions of the housing may be varied for different shapes and designs.

Figure 3:
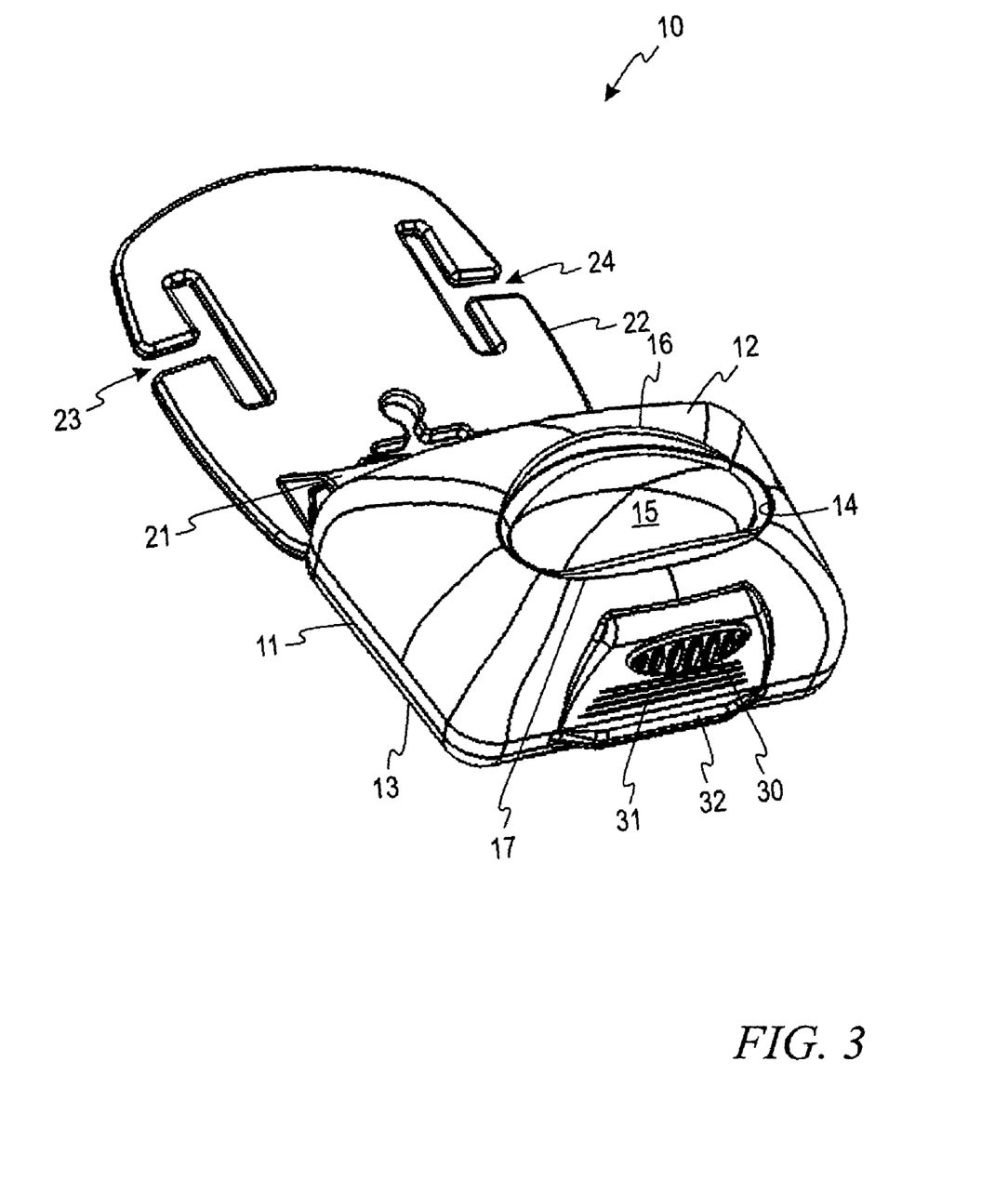
FIG. 3 is a bottom perspective view of the flashlight of FIGS. 1A and 1B.
Figure 4:
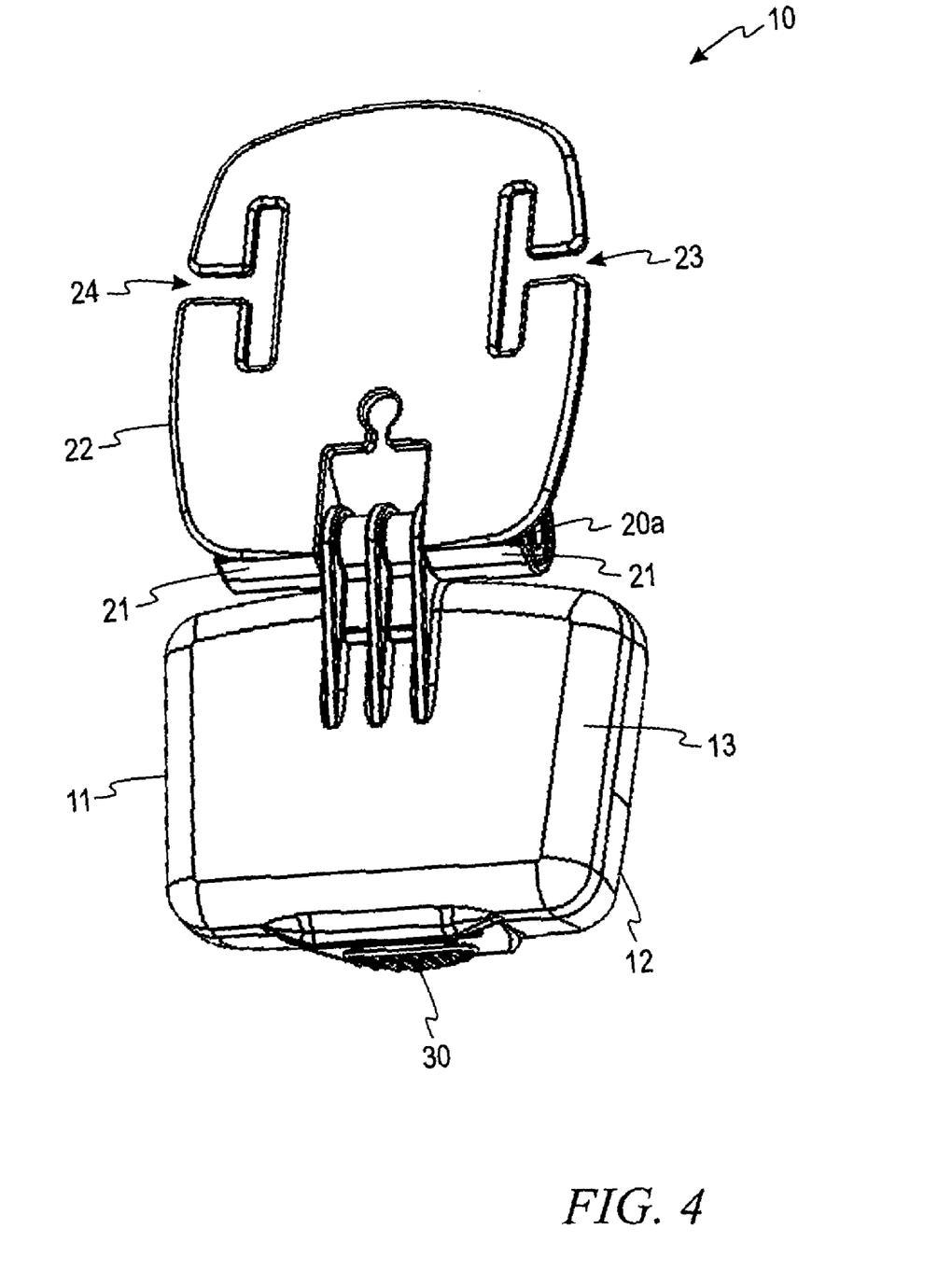
FIG. 4 is a rear perspective view of the flashlight of FIGS. 1A and 1B.

A hinge section 20 is molded as an integral part of the rear housing section 13, and mates with a complementary hinge section 21 formed as an integral part of an attachment clip 22. A pin 20a is inserted through the two hinge sections 20 and 21 to hold them together while permitting rotational movement of the two hinge sections relative to each other. The opposed surfaces of the two hinge sections 20 and 21 that move relative to each other are roughened to increase the friction between those surfaces, to inhibit swinging movement of the housing 11 and thereby improve the stability of the light beam. Thus, the angular position of the housing 11 can be adjusted relative to the clip 22 to optimize the illuminated area in front of a person wearing the flashlight, and the housing will remain in the selected position. The hinge also permits the housing to be rotated 180 degrees so that it lies flat against the clip 22 before the clip is attached to the loop used to suspend the housing from the neck of a user, thereby providing a shorter unit.

The clip 22 also forms a pair of T-shaped slots 23 and 24 opening through opposite edges of the clip for receiving and holding a loop 25 (see FIGS. 1A and 1B) adapted to fit around the user's neck. As can be seen in FIG. 4, the housing 11 depends from the bottom edge of the clip 22, and the lens 15 is located toward the lower end of the housing 11, so that the light emanates from the lens a couple of inches or more below the loop 25. The loop 25 can be made of a variety of different materials, such as those commonly used to suspend a pair of glasses from the neck of a person. The loop is preferably adjustable to permit the housing 11 to be positioned at different elevations on the user's chest, and to accommodate users of different sizes. The loop may also be made of an elastic material to facilitate the application to, and removal from, the user's neck.

An on/off switch 30 is located on the bottom of the front housing section 12. A pattern area 31 and a lip 32 are molded into the housing to provide finger and thumb surfaces that can be felt and gripped when opening the housing 11 to change batteries or to access the interior of the housing for other purposes such as to replace the light sources.

Figure 5:
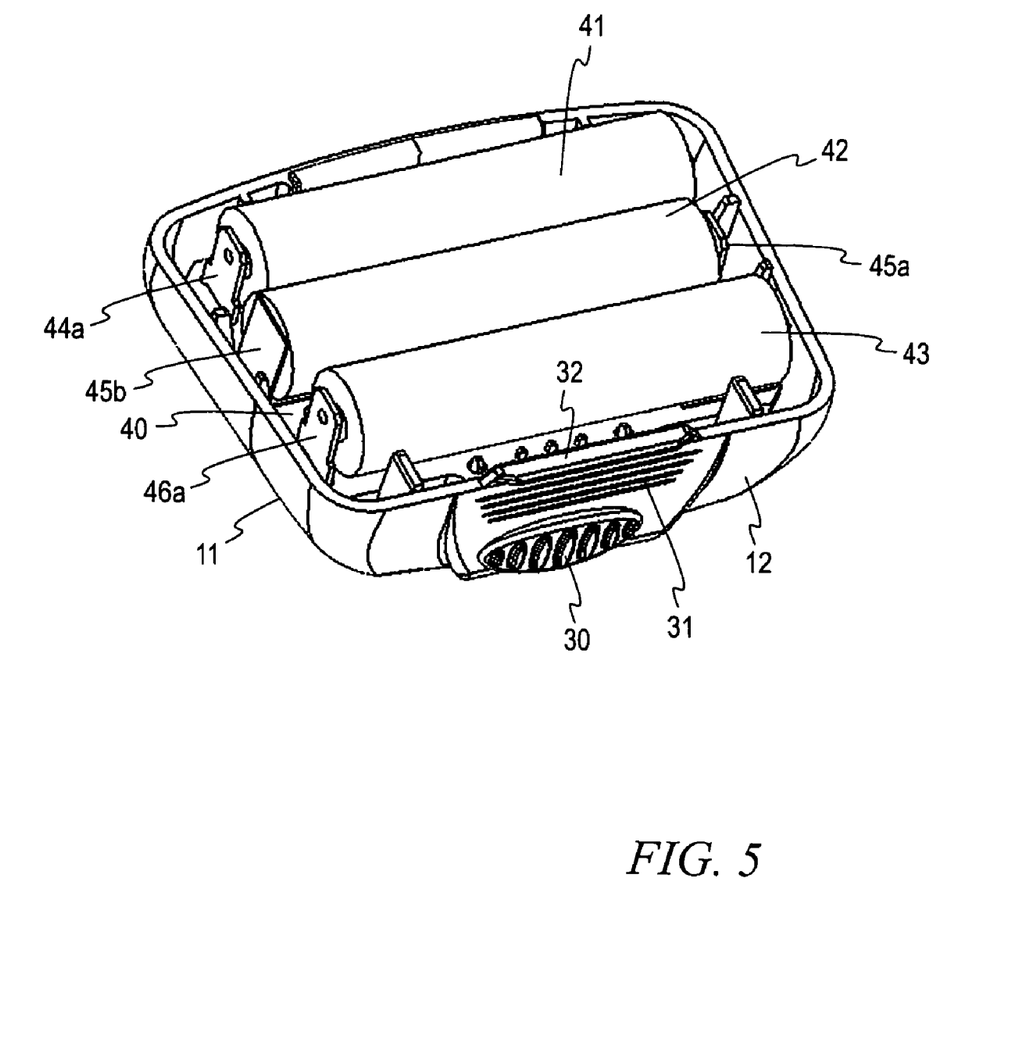
FIG. 5 is a perspective view of the interior of the rear section of the flashlight of FIGS. 1A and 1B.
Figure 6:
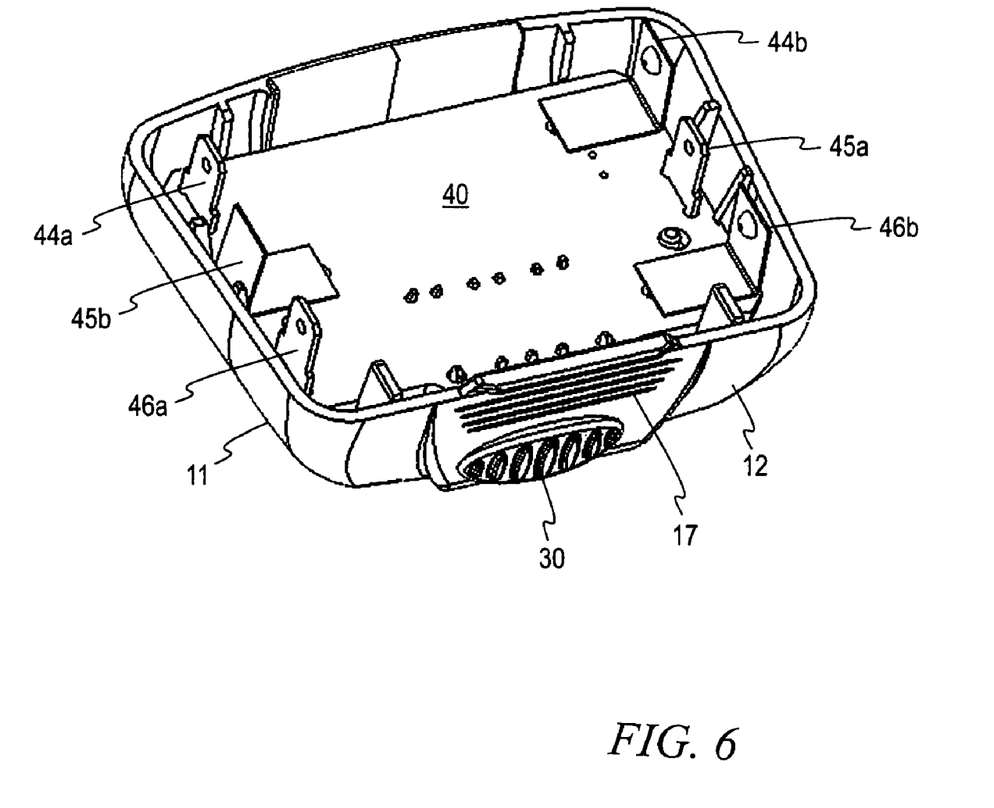
FIG. 6 is the same perspective view shown in FIG. 5 with the batteries removed.

FIG. 5 shows the interior of the front housing section 12, which contains an internal circuit board 40. Three 1.5-volt alkaline batteries 41, 42 and 43 are mounted on the rear side of the circuit board 40, making contact with three pairs of conventional battery terminals 44a and 44b, 45a and 45b, and 46a and 46b attached to the circuit board 40. FIG. 6 is the same view as FIG. 5 with the batteries removed to more clearly show the battery terminals and their attachments to the circuit board 40.

Figure 7:
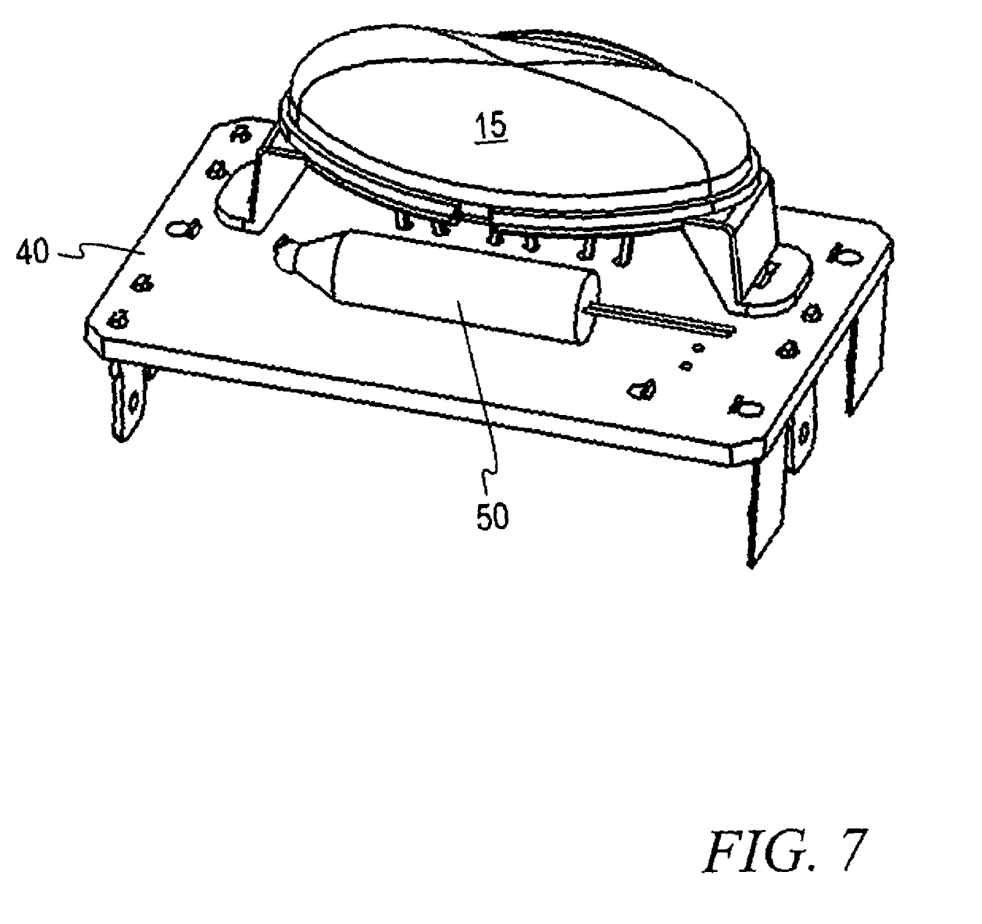
FIG. 7 is a perspective view of one side of the circuit board contained in the front section of the flashlight of FIGS. 1A and 1B.
Figure 8:
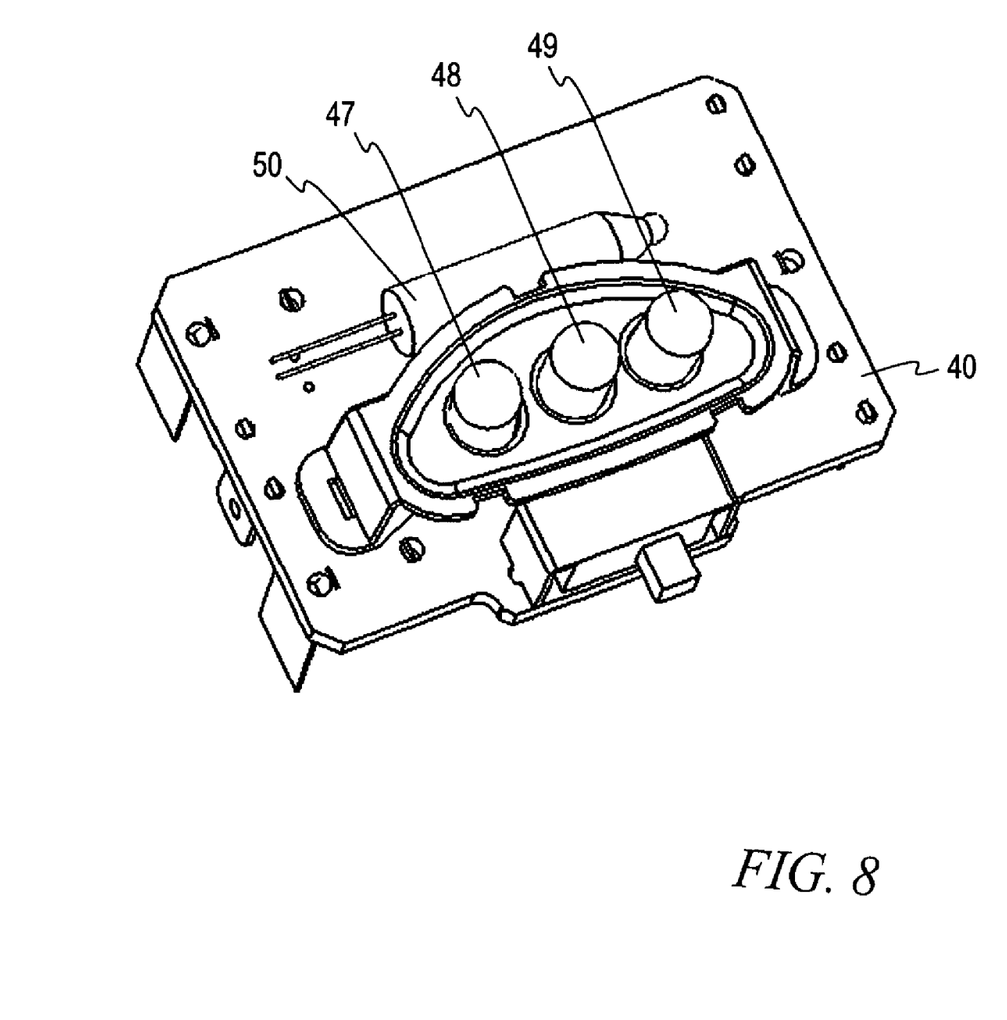
FIG. 8 is a perspective view of the other side of the circuit board contained in the front section of the flashlight of FIGS. 1A and 1B.

FIGS. 7 and 8 show the circuit board 40 without the housing. It can be seen that the lens 15 is mounted on the front side of the board 40, and three light emitting diodes (LEDs) 47, 48 and 49 are mounted on the board directly below the lens 15 (see FIG. 8). The center LED 48 is positioned to emit a light beam directed straight forward, while the two side LEDs 47 and 49 are positioned to emit light beams directed slightly outwardly. The LEDs preferably emit white light with about 12,000 to 14,000 millicandelas. This combination of light beams is capable of illuminating an area extending as far as 200 feet in front of the user, with a beam width that is at least 5 feet wide at a distance of about 10 feet in front of the user. It will be understood that the LEDs may be varied in both number and size, but it is preferred that the source or sources be sufficient to illuminate an area extending at least 10 feet, most preferably at least 20 feet, in front of the user.

An incandescent lamp 50 is also mounted on the front side of the board 40, for a purpose to be described below. Finally, the on/off switch 30 is also mounted on the front side of the board 40, adjacent the bottom edge of the board.

Figure 9:
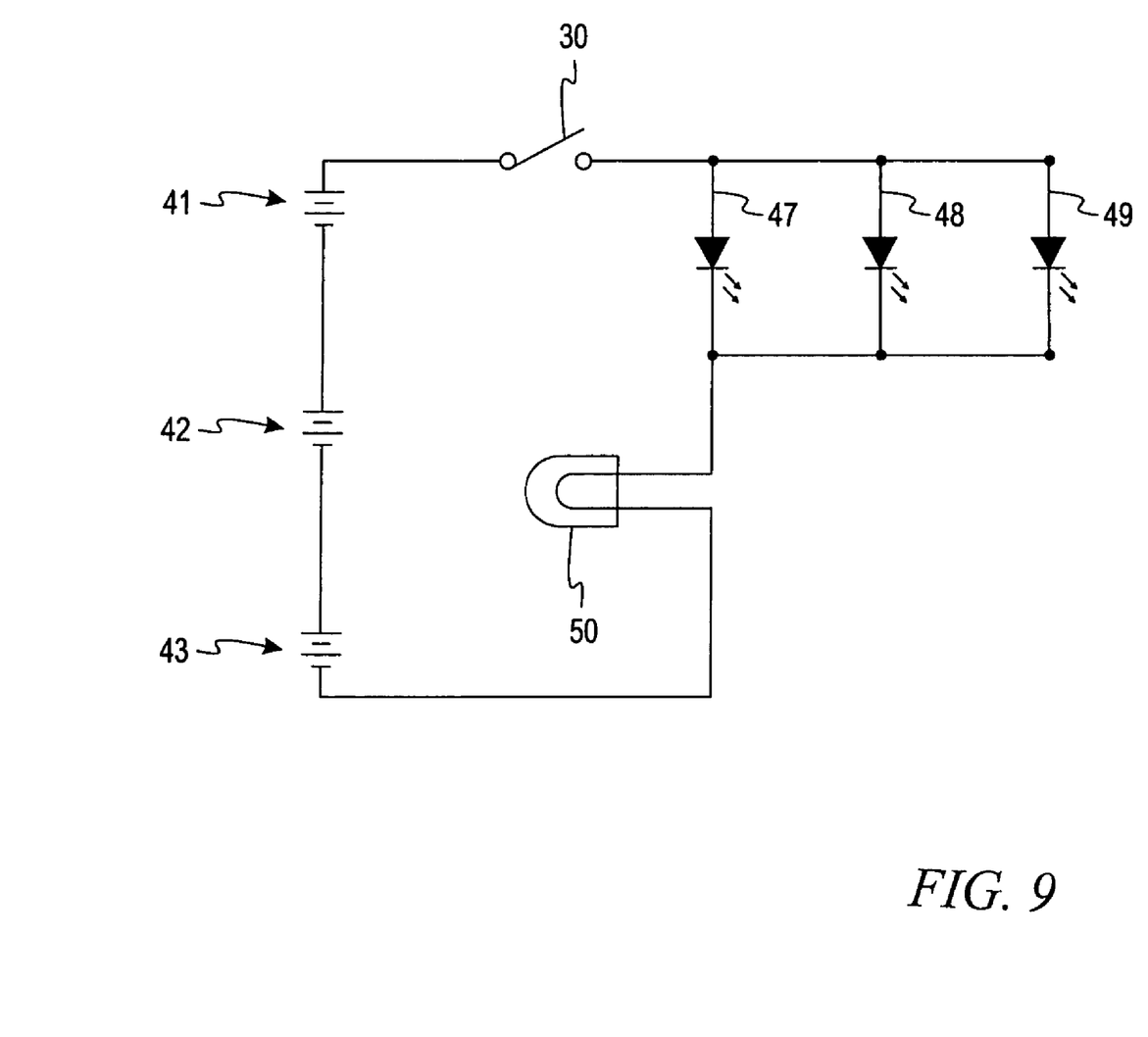
FIG. 9 is an electrical schematic of the electrical circuit contained in the flashlight of FIGS. 1A and 1B.

FIG. 9 is a schematic diagram of the electrical circuit provided the circuit board 40 to interconnect the various components mounted thereon. The three 1.5-volt alkaline batteries (AAA) 41–43 are electrically connected in series to provide 4.5 DC volts to the circuit through a sliding SPST on/off switch 30. The three white LEDS 47–49 are connected in parallel with each other and in series with the switch 30 so that all three LEDs are illuminated when the switch 30 is turned closed. The incandescent, tungsten-filament lamp 50, of the kind used for ornamental lighting, e.g., as in Christmas tree light string, is used as a constant current ballast resistor in the circuit. The current flowing through the tungsten filament of the lamp 50 varies with the available voltage from the batteries 41–43 due to the positive temperature coefficient of the filament, thereby providing a substantially constant amount of current to the LEDs 47–49. By using the incandescent lamp 50 as a variable resistor, the life of the batteries is extended and the intensity of the white LEDs 47–49 is more uniform over the life of the batteries 41–43.

If desired, a variable impedance may be added to the circuit to permit the intensity of the light beam to be adjusted by a manually operated adjustment device (e.g., a knob) accessible on an exterior surface of the housing. A mechanically adjustable reflector may also be used to permit the light beam width to be adjusted.

If desired, red or green LEDs or lenses may be used instead of white LEDs and a clear lens. Red and green light assists night vision (e.g., for hunting), and animals are more comfortable with green light. Combinations of LEDs of different colors may also be used, with one or more switches to permit selection of a light beam of the desired color.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of illuminating the area in front of a person without requiring the use of the person's hands, comprising:
    suspending from the neck of the person a housing containing at least one LED light source emitting a light beam extending forwardly from said person, a battery power supply for said light source, and a switch connected between said light source and said power supply for energizing and de-energizing said light source, said housing being shaped to rest against the chest of said person so that the direction of said light beam remains substantially stable,
    a connector hinged to said housing, and
    a flexible loop coupled to said connector for suspending said housing from the neck of said person so that said housing is located in front of the chest of said person, wherein said housing is pivotable relative to said connector to permit the light beam from said light source to be directed forwardly from said person through a preselected range of angles both above and below a horizontal axis.

2. The method of claim 1 wherein said light source comprises a plurality of LED light sources.

3. The method of claim 1 which includes a hinge between said connector and said housing that restricts the movement of said housing after it has been positioned to direct said light beam at a desired angle.

4. The method of claim 1 wherein said light source illuminates an area extending at least about 10 feet in front of the person.

5. The method of claim 1 wherein said light source illuminates an area extending at least about 20 feet in front of the person.

6. The method of claim 1 wherein said light source is a white LED light source.

7. The method of claim 1 wherein said light source emits a light beam that has a width of at least about 5 feet at a distance of about 10 feet in front of said person.

8. The method of claim 1 wherein said housing is suspended in a manner that inhibits swinging movement of said housing.

9. A flashlight for illuminating the area in front of a person without requiring the use of the person's hands, comprising
 a housing containing at least one LED light source, a battery power supply for said light source, and a switch connected between said light source and said power supply for energizing and de-energizing said light source, and
 an attachment device including a loop carrying said housing and adapted to surround the neck of said person so that said housing is located in front of the chest of said persons,
 a connector hinged to said housing, and
 a flexible loop coupled to said connector for suspending said housing from the neck of said person so that said housing is located in front of the chest of said person,
 wherein said housing is pivotable relative to said connector to permit the light beam from said light source to be directed forwardly from said person through a preselected range of angles both above and below a horizontal axis.

10. The flashlight of claim 9 wherein said loop has an adjustable length.

11. The flashlight of claim 9 wherein said light source comprises a plurality of LED light sources.

12. The flashlight of claim 9 which includes a hinge between said connector and said housing that restricts the movement of said housing after it has been positioned to direct said light beam at a desired angle.

13. The flashlight of claim 9 wherein said light source illuminates an area extending at least about 20 feet in front of the person.

14. The flashlight of claim 9 wherein said light source is a white LED light source.

15. The flashlight of claim 9 wherein said light source emits a light beam that has a width of at least about 5 feet at a distance of about 10 feet in front of said person.

16. The flashlight of claim 9 wherein said housing is suspended in a manner that inhibits swinging movement of said housing.

* * * * *